United States Patent
Sasaki

(10) Patent No.: US 6,345,054 B1
(45) Date of Patent: Feb. 5, 2002

(54) CELL RELAY COMMUNICATION METHOD, CELL RELAY COMMUNICATION SYSTEM AND CELL RELAY COMMUNICATION EQUIPMENT

(75) Inventor: Toshimitsu Sasaki, Koriyama (JP)

(73) Assignee: Hitachi Telecom Technologies, Ltd., Koriyama (JP)

(*) Notice: Subject to any disclaimer, the term of this patent is extended or adjusted under 35 U.S.C. 154(b) by 0 days.

(21) Appl. No.: 09/164,584

(22) Filed: Oct. 1, 1998

(30) Foreign Application Priority Data

Oct. 1, 1997 (JP) .............................................. 9-268303

(51) Int. Cl.[7] .............................. H04J 3/22; H04J 3/16
(52) U.S. Cl. ..................... 370/465; 370/474; 370/395.1
(58) Field of Search ................................ 370/352, 356, 370/389, 395, 396, 398, 400, 401, 474, 476, 465, 395.1

(56) References Cited

U.S. PATENT DOCUMENTS

| | | | |
|---|---|---|---|
| 5,315,588 A | * | 5/1994 | Kajiwara et al. ............ 370/389 |
| 5,450,399 A | * | 9/1995 | Sugita ......................... 370/392 |
| 5,638,364 A | * | 6/1997 | Sugita ......................... 370/397 |
| 5,654,964 A | * | 8/1997 | Wake .......................... 370/395 |
| 5,737,312 A | * | 4/1998 | Sasagawa .................... 370/232 |
| 5,926,477 A | * | 7/1999 | Shirokura et al. ........... 370/395 |
| 5,940,407 A | * | 8/1999 | Tamura ....................... 370/493 |

* cited by examiner

Primary Examiner—Ajit Patel
Assistant Examiner—Bob A. Phunkulh
(74) Attorney, Agent, or Firm—Antonelli, Terry, Stout & Kraus, LLP

(57) ABSTRACT

A cell relay communication equipment 50 to be used in a relay system connecting a transmission device 10 having a voice relay function and a call transmission/reception control function through a CLAD device 30 to an ATM network 20, wherein a relay call identification/indication means 51 for identifying and indicating whether the call received from the ATM network 20 is a relay call or a locally-addressed call, and a transfer speed selection means 52 for transferring the received call by high-speed transmission to the transmission device 10 when the relay call identification/ indication means 51 indicates that the call is a relay call, and transfers the call by a compressed voice data speed to the transmission device 10 when the call is a locally-addressed call, are mounted between the transmission device 10 and the cell assembly and disassembly device 30.

3 Claims, 7 Drawing Sheets

ONE-BIT TRANSFER OF LOCALLY-ADDRESSED CALL

8 BITS FOR RELAY CALL

ATM CELL STRUCTURE

RELAY CALL DATA STRUCTURE

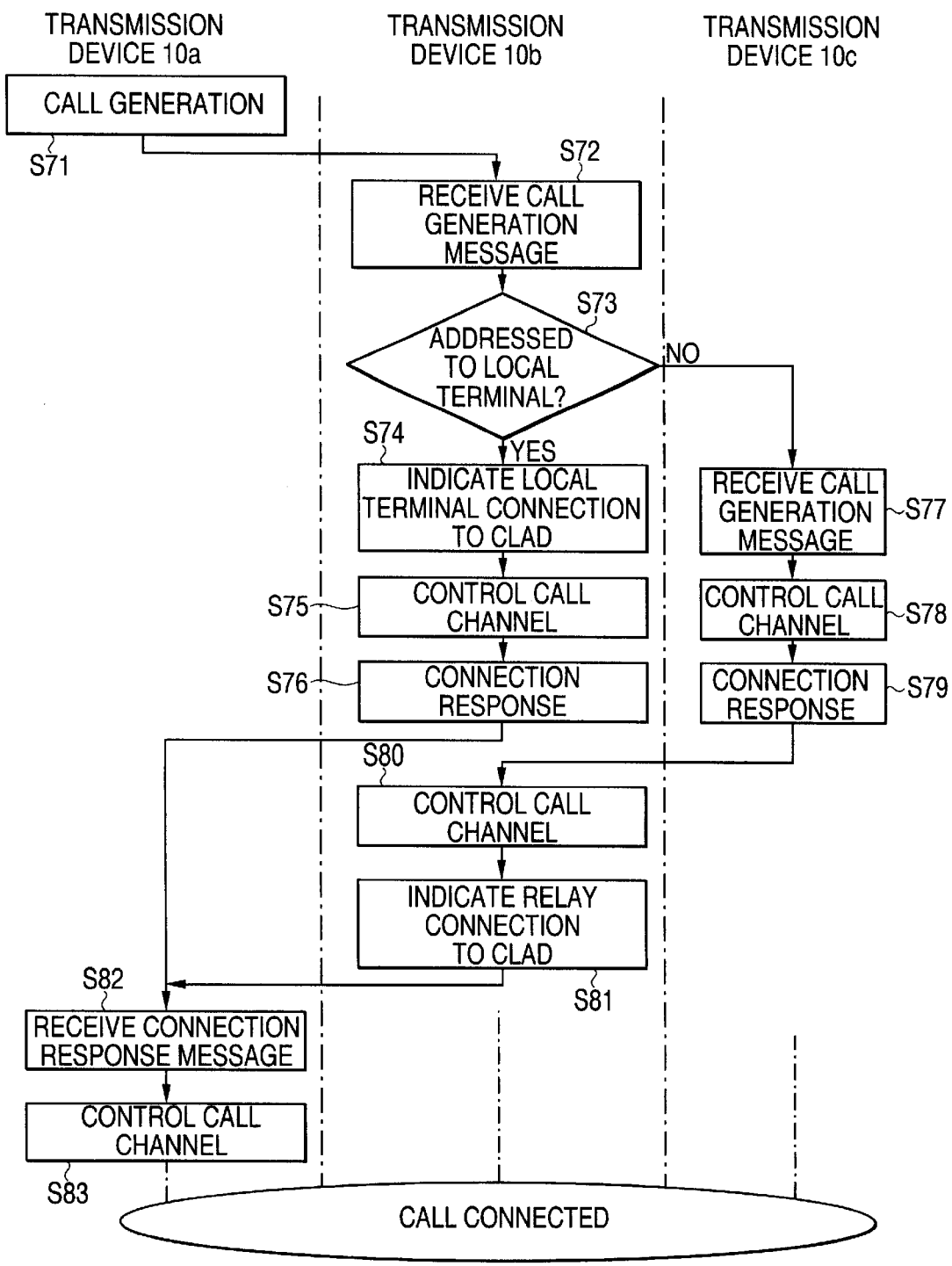

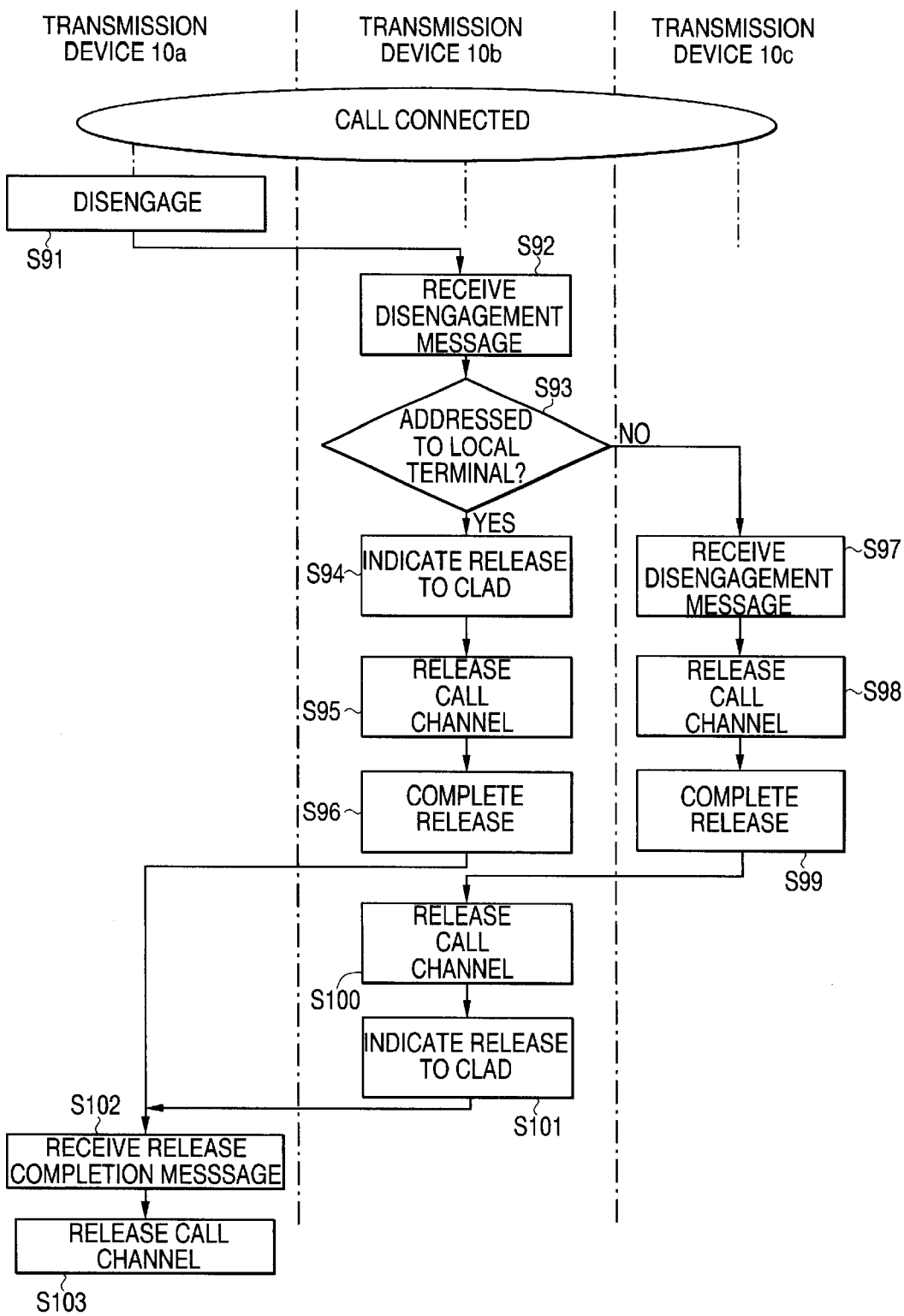

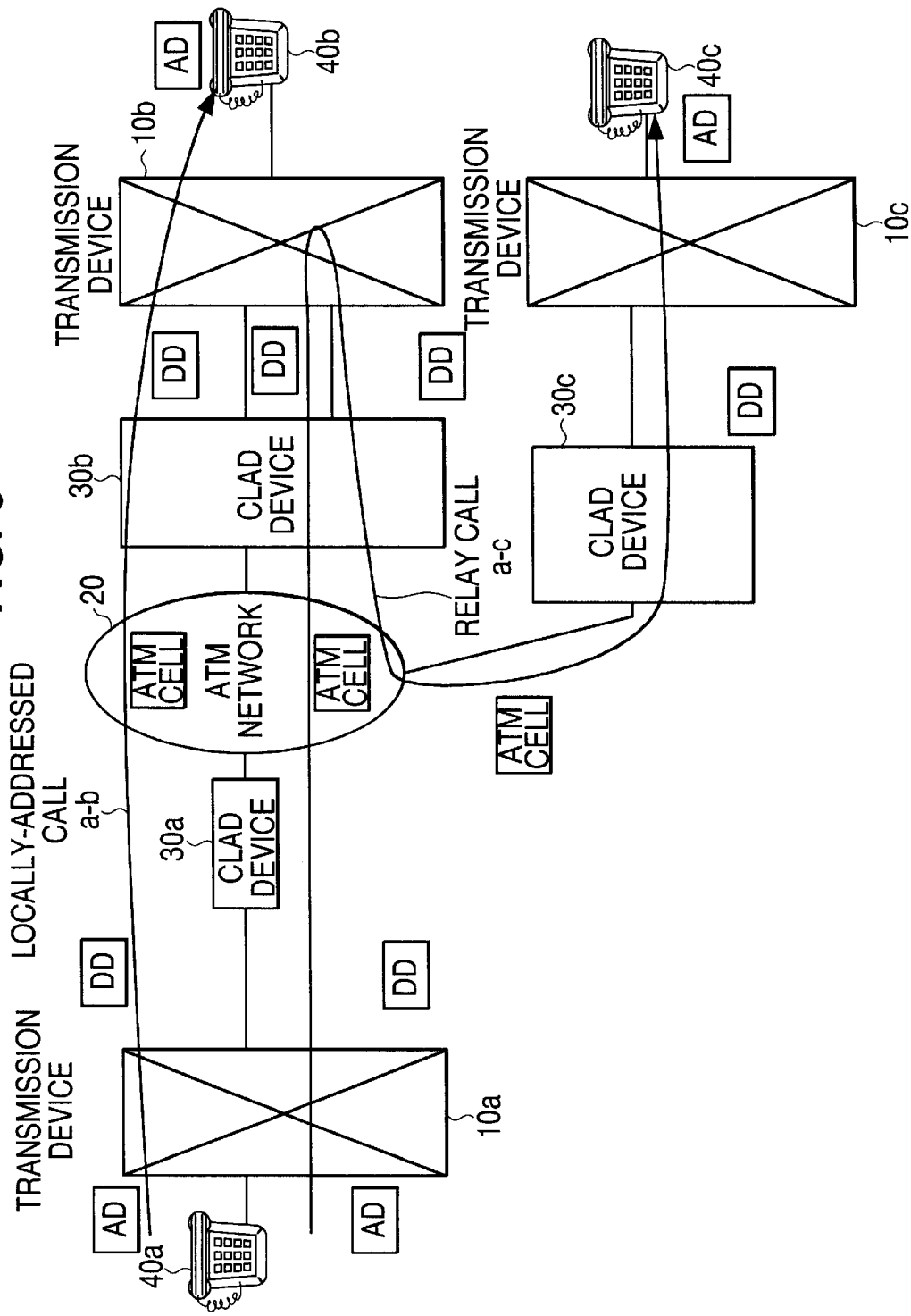

CELL RELAY COMMUNICATION METHOD, CELL RELAY COMMUNICATION SYSTEM AND CELL RELAY COMMUNICATION EQUIPMENT

BACKGROUND OF THE INVENTION

The present invention relates to a cell relay communication method, cell relay communication system and cell relay communication equipment for relaying compressed voice data wherein the delay time caused by the communication relay is shortened in a communication network comprising of a plurality of transmission devices connected to an ATM network.

The system structure of a prior art cell relay network communicated through an ATM network is explained with reference to FIG. 9.

The relay network is formed by connecting a plurality of transmission devices 10a through 10c of a private branch exchange (hereinafter called PBX) having a voice relay function and a call transmission/reception control function or a multiplexing device (hereinafter called TDM) each storing extension telephones 40 and the like to an ATM network 20 through a cell assembly and disassembly device (hereinafter called CLAD device) having a function of assembling and disassembling cells.

Each CLAD device 30a through 30c comprises a function to disassemble the cells received from the ATM network 20 into bit-strings of digital data having a fixed communication speed such as voice communication, to transfer the same to the transmission device, and to assemble the digital data bit-strings received from the transmission device into cells and transmit the same to the ATM network 20.

In a cell relay network having the above-mentioned structure, for example, the analog voice data [AD] from the telephone 40a is converted to digital data bit-strings [DD] at the transmission device 10a, and then transferred to the CLAD device 30a. The CLAD device 30a assembles the transferred digital data bit-strings into cells [ATM cell] for multiplexing, and transmits the cells to the corresponding CLAD device 30b through the ATM network 20.

At the corresponding CLAD device 30b, the multiplexed cells are disassembled to receive the cells locally-addressed to said device 30b, converts the cells into digital data bit-strings [DD] and transfers the same to the transmission device 10b. The transmission device 10b restores the digital data bit-strings to voice data [AD], and outputs the data to a telephone 40b.

As disclosed, the transmission device 10 holds the function of transferring the cells transmitted thereto to other terminals, and a call transmission/reception control function for controlling the transmission or reception of calls from or to its own terminal.

That is, when taking the transmission device 10b as an example, the calls that will be handled by the transmission device 10b will include a locally-addressed call to its own terminal where a call channel is formed from a telephone 40a connected to the call generation side transmission device 10a through the transmission device 10a, the CLAD device 30a, the ATM network 20, the transmission device 10b, and the telephone 40b as shown by the arrow a–b, and will also include a relay call where the call channel is formed between the telephone 40a, the transmission device 10a, the CLAD device 30a, the ATM network 20, the CLAD device 30b, the transmission device 10b, the CLAD device 30b, the ATM network 20, the CLAD device 30c, the transmission device 10c, and the telephone 40c shown by the arrow a–c.

In a relay call, the CLAD device 30b converts the cells received from the ATM network 20 [ATM cells] to a low-speed voice compression data [DD], and transfers said data to the transmission device 10b, where the low-speed voice compression data [DD] is transferred to the relay channel, and the CLAD device 30b converts the data into cells [ATM cells] again and transfers said cells to the ATM network 20, for the data to be relayed to the transmission device 10c.

In such relay method, there was a loss of time for the CLAD device 30b to receive the low-speed voice compression data [DD] from the transmission device 10b and to assemble the data into cells [ATM cells], which caused a delay time of the voice. For example, when the voice was compressed to 8 Kbps, it took 48 ms for the CLAD device 30b to receive the low-speed voice compression data [DD], which becomes the voice delay time.

SUMMARY OF THE INVENTION

The present invention aims at solving the above problems, and the object of the invention is to provide a relay system comprising a transmission device of PBX or TDM having a voice relay function and a call transmission/reception control function which is connected to an ATM network through a CLAD device, wherein the compressed voice data is relayed by high-speed transfer between the CLAD device and the transmission device, so as to shorten the delay time of the relay.

In order to solve the above problems, the present invention provides a cell relay communication method in a relay system comprising a transmission device having a voice relay function and a call transmission/reception control function connected to an ATM network through a cell assembly and disassembly device having a function of assembling and disassembling cells, wherein the method identifies whether a call received from the ATM network is a relay call or a locally-addressed call, and when said received call is a relay call, said received call is relayed by high-speed transfer through the transmission device, and when said received call is a locally-addressed call, said received call is transferred by compressed voice data speed to the transmission device.

Moreover, the present invention provides a cell relay communication method in a relay system comprising a transmission device having a voice relay function and a call transmission/reception control function connected to an ATM network through a cell assembly and disassembly device having a function of assembling and disassembling cells, wherein the method comprises between the transmission device and the cell assembly and disassembly device a relay call identification/indication function for identifying and displaying whether a call received from the ATM network is a relay call or a locally addressed call, and a transfer speed selection function for relaying the call by high-speed transfer through the transmission device when said received call is a relay call, and transferring the call by a compressed voice data speed to the transmission device when said received call is a locally addressed call, so as to shorten the delay time by relaying the call.

Moreover, the present invention provides a cell relay communication equipment to be used in a relay system comprising a transmission device having a voice relay function and a call transmission/reception control function connected to an ATM network through a cell assembly and disassembly device having a function of assembling and disassembling cells, wherein the equipment includes between the transmission device and the cell assembly and disassembly device a relay call identification/indication means for identifying and indicating whether a call received from the ATM network is a relay call or a locally addressed call, and a transfer speed selection means for relaying the call by high-speed transfer to the transmission device when said display of the relay call identification/indication means is a relay call, and for transferring the call by a compressed voice data speed to the transmission device when said display of the relay call identification/indication means is a locally addressed call.

According to the present invention, in a relay system comprising a transmission device having a relay function and a call transmission/reception control function connected to an ATM network through a cell assembly and disassembly device having a function for assembling and disassembling cells, the delay time of transmission in a relay call may be shortened by identifying and displaying whether the call received from the ATM network is a relay call or a locally addressed call, and by selecting the transfer mode according to the display by the transfer speed selection means.

BRIEF DESCRIPTION OF THE DRAWINGS

FIG. 7 is a flowchart showing how the call channel is set in the call connection operation between the transmission devices;

FIG. 8 is a flowchart showing the release of the call channel in the call connection operation between the transmission devices; and FIG. 9 is a block diagram showing the system structure of the cell relay network including the ATM network according to the prior art.

PREFERRED EMBODIMENT OF THE INVENTION

Figure 1:
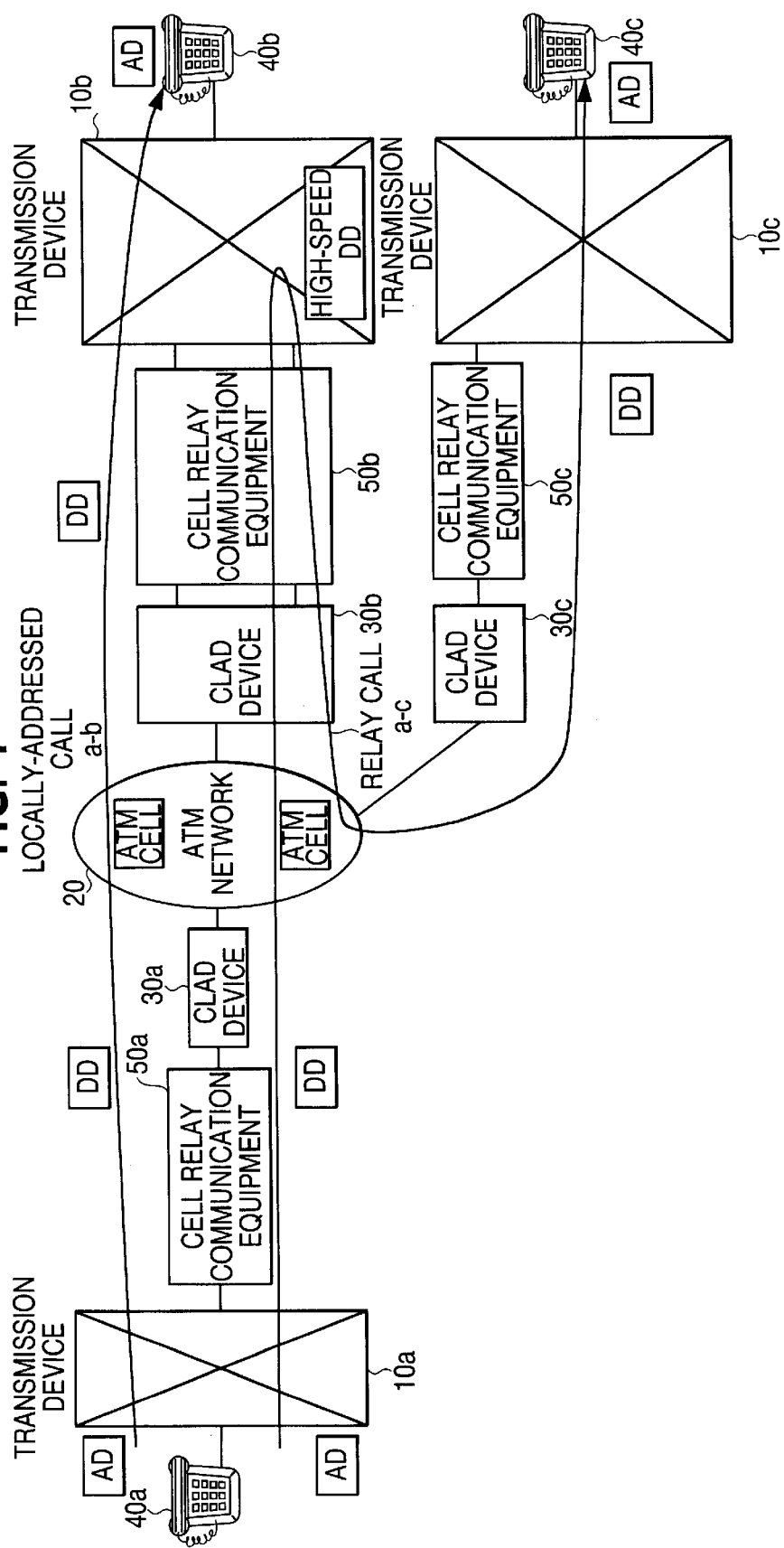
FIG. 1 is a block diagram showing the system structure of the relay network for applying the cell relay communication method according to the present invention.

FIG. 1 shows the system composition of the relay network to which the cell relay communication method and system according to the present invention is applied.

The relay network according to the present invention is formed by connecting a plurality of transmission devices 10a through 10c each storing telephones 40a through 40c to an ATM network 20 via cell relay communication equipment 50a through 50c and CLAD devices 30a through 30c, respectively.

The transmission device 10 is arranged as a transmission device such as a PBX or TDM having a voice relay function, and comprises the call transmission/reception control function for controlling the transmission and reception of a locally addressed call, and a relay function for transferring the cells received from the ATM network 20 to other locations.

That is, the transmission device 10 holds the function of transmitting to the cell relay communication equipment 50 a voice data received from the telephone 40 and converted into digital data bit-strings by compressing the data into lower speed such as 8 Kbps, and a function of transferring to the telephone 40 the locally-addressed low-speed digital data bit-strings which are received from the cell relay communication equipment 50 and converted into voice data.

Moreover, the transmission device 10 holds the function of relaying the high-speed relay cells transmitted from the cell relay communication equipment 50 as it is (without any conversion) and returning it back to the cell relay communication equipment 50.

Even further, the transmission device 10 holds the function of recognizing whether the call from the ATM network 20 is a locally-addressed call or a relay call, and if it is a relay call, transmitting a notice that the call is a relay call to the cell relay communication equipment 50.

The CLAD device 30 holds the function of assembling digital data bit-strings having a fixed communication speed, such as voice communication, into ATM cells and transmitting the same to the ATM network 20, and a function of disassembling and taking out the digital data bit-strings from the ATM cells being received from the ATM network 20.

The cell relay communication equipment 50 holds a relay call identification/indication function for identifying and displaying whether the ATM cell received from the ATM network 20 is for a locally-addressed call or a relay call based on the notice from the transmission device informing that the call is a relay call, and a transfer speed selection function for relaying the received call with high-speed through the transmission device without converting the call into low-speed digital data bit-strings when said received call is a relay call, and transferring the received call to the transmission device with compressed voice data speed by converting the data into low-speed data bit-strings when said received call is a locally-addressed call.

The voice data from the telephone 40 is converted into digital data bit-strings at the transmission device 10, and then transferred to the CLAD device 30 through the cell relay communication equipment 51. In the CLAD device 30, the transferred digital data bit-strings are assembled into ATM cells, and transmitted to the ATM network 20.

Figure 2:
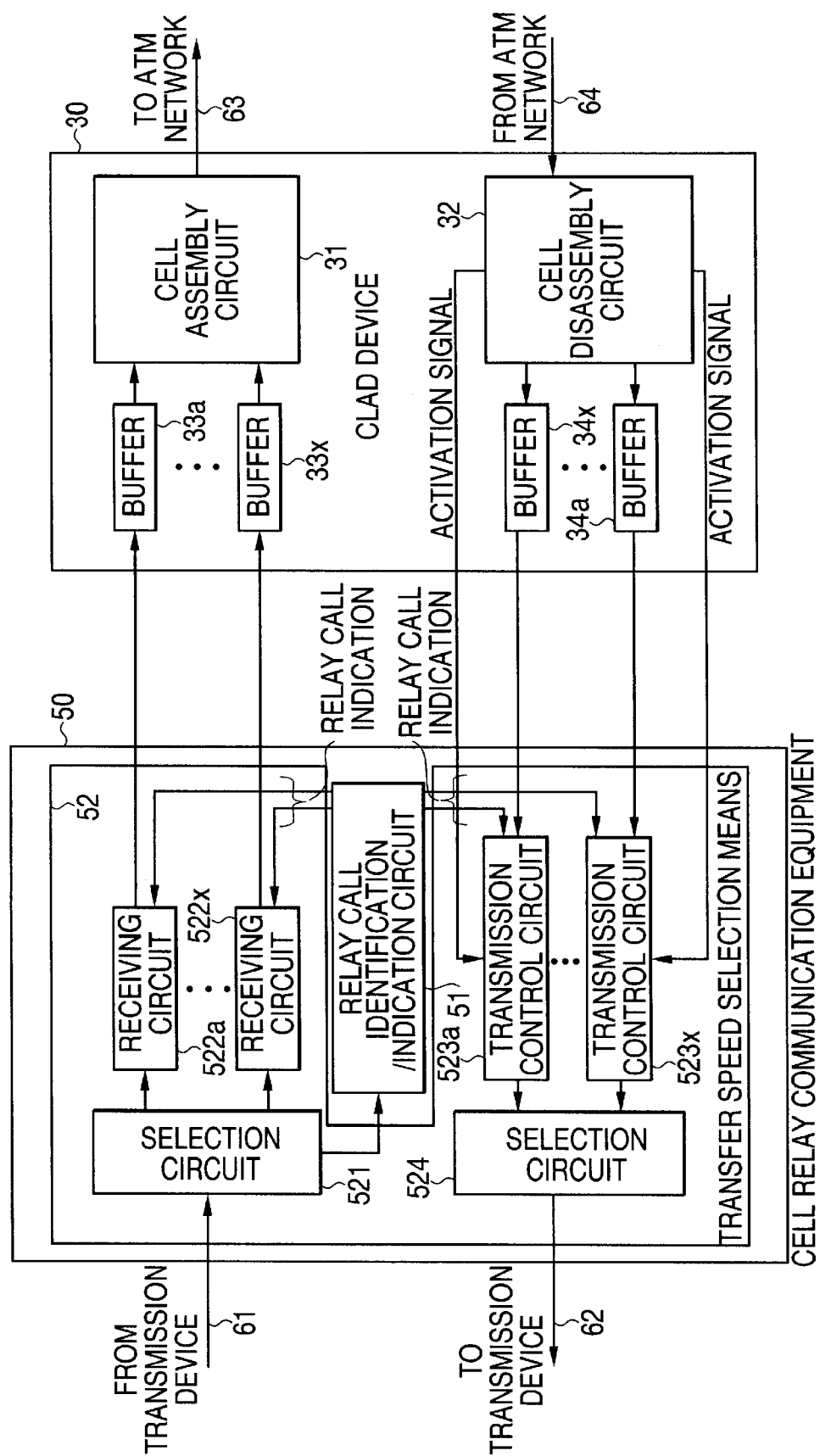
FIG. 2 is a block diagram showing the hardware structure of the CLAD device 30 and the cell relay communication equipment 50 according to the present invention.

The hardware block composition of the CLAD device 30 and the cell relay communication equipment 50 according to the present invention is explained with reference to FIG. 2.

The CLAD device 30 comprises a cell assembly circuit 31 having a function of assembling the digital data bit-strings into ATM cells, a cell disassembly circuit 32 having a function of disassembling the ATM cells into digital data bit-strings according to each timeslot, "n" numbers of buffers 33a through 33x (for example, twenty-four buffers if the timeslot is 24) for storing data from the transmission device 10 according to each timeslot, and 24 buffers 34a through 34x for storing the digital data bit-strings transmitted from the cell disassembly circuit 32 according to each timeslot.

The CLAD device 30 distributes the digital data bitstrings gained by disassembling the ATM cells received from the ATM network 20 to buffers 34a through 34x corresponding to each timeslot. The CLAD device 30 distributes the digital data bit-strings received from the transmission device 10 to buffers 33a through 33x corresponding to each timeslot set in correspondence to the addresses.

The cell relay communication equipment 50 comprises a relay call identification/indication circuit 51 for recognizing whether the call is a relay call and displaying (instructing) the fact to the receiving circuit and the transmitting circuit mentioned hereinafter, and a transfer speed selection circuit 52 for converting the call into low-speed digital data bit-strings when the received call is a locally-addressed call, and converting it into high-speed digital data bit-strings when the call is a relay call.

The relay call identification/indication circuit 51 receives a notice that the call is a relay call from the transmission device 10, and when the call is a relay call, indicates that the call is a relay call to the receiving circuit 522a through 522x connected to the buffers 33a through 33x and to the transmission control circuit 524a through 524x connected to the buffers 34a through 34x, which correspond to the timeslot.

The selection circuit 521 distributes the digital data bit-strings from the transmission device 10 to receiving circuits 522a through 522x equipped in correspondence to each timeslot.

The twenty-four receiving circuits 522a through 522x equipped in correspondence to each timeslot extracts eight bits from the timeslot when there is an indication from the relay call identification/indication circuit 51 that the call is a relay call, and when it is detected that all the eight bits working as a data head identifier show "0", then the forty-eight bytes continuing therefrom are stored in the buffer 33 of the CLAD device 30 connected to said receiving circuit.

When there is no indication that the call is a relay call, the receiving circuit 522 stores one bit for each timeslot to the buffer 33 of the CLAD device connected to the receiving circuit.

The transmission control circuit 52 equipped in correspondence to the timeslot and the buffer 34 is activated by the activation signal received from the cell disassembly circuit 32.

When the indication of the relay call identification/indication circuit 51 is not a relay call, the activated transmission control circuit 52 picks up one bit from the buffer 34 for one timeslot in the case where the data is a voice data compressed to 8 Kbps, and sends it out to the selection circuit 524.

The transfer process in the CLAD device 30 and the cell relay communication equipment 50 is now explained.

At first, the communication connection operation performed between the transmission devices are explained. The communication connection operation is performed by the control channel of the SD-I circuit, and the CLAD device and the cell relay device transmits substantially transparently the information relating to the communication connection operation performed between the transmission devices.

FIG. 7 is a flowchart showing the example of the operation for setting up a communication channel from the transmission device 10a to the transmission device 10b or 10c. The operation for setting up the communication path is explained with reference to FIG. 7.

When a call is generated from the transmission device 10a to the transmission device 10b or 10c (S71), then a call generation message is transmitted to the transmission device 10b.

Upon receipt of the call generation message (S72), the transmission device 10b determines whether the call is addressed to itself or not (S73), and when the call is addressed thereto, indicates to the CLAD device 30b that the call is addressed thereto (S74).

Next, the communication channel in the transmission device 10b is established (S75), and the connection response message is transmitted to the transmission device 10a (S76).

On the other hand, in step S73, when the transmission device 10b determines that the call generation message is addressed to another terminal (transmission device 10c), then said call generation message is transmitted to the transmission device 10c.

Upon receipt of the message (S77), the transmission device 10c sets up a communication channel in the device (S78), and transmits the connection response message to the transmission device 10b (S79).

Next, the connection response message is recognized in the transmission device 10b, and the device sets up a communication path for relaying the call (S80), and indicates to the CLAD device 30b that the call is addressed to another terminal and that it will be relayed (S81), and transmits the connection response message from the transmission device 10c to the transmission device 10a.

Next, upon receipt of the connection response message (S82), the transmission device 10a sets up a communication channel inside the device 10a (S83), and moves on to a state where the call is connected.

FIG. 8 is a flowchart showing the example of the operation for releasing the communication channel between the transmission device 10b or 10c by the request from the transmission device 10a.

When the request for disengagement is sent out from the transmission device 10a to either the transmission device 10b or 10c (S91), a disengagement message is transmitted to the transmission device 10b.

Upon receipt of the disengagement message (S92), the transmission device 10b determines whether the request is addressed thereto or not (S93), and if it is addressed to itself, indicates to the CLAD device 30b to release the communication channel (S94). Then, it releases the communication channel set up in the device 10b (S95), and sends out a release completion message to the transmission device 10a.

On the other hand, when it is determined in the transmission device 10b that the disengagement message is addressed to another terminal (transmission device 10c), the disengagement message is transmitted to the transmission device 10c.

Upon receipt of the message (S97), the transmission device 10c releases the communication channel set up in the device (S98), and transmits a release completion message to the transmission device 10b (S99).

Then, the transmission device 10b recognizes the release completion message and releases the communication path relaying the call (S100), and indicates to the CLAD device 30b to release the communication channel, and transmits the release completion message from the transmission device 10c to the transmission device 10a.

Upon receipt of said release completion message (S102), the transmission device 10a releases the call channel set up inside the device (S103), and disconnects the call which was in the connected state.

Figure 3:
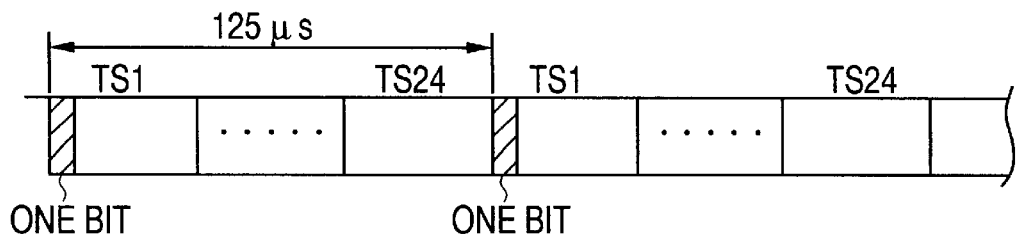
FIG. 3 shows a transfer frame structure for a locally-addressed call of an 8 Kbps voice compression data transmitted between the CLAD device and the transmission device.

By the above-mentioned communication connection operation, the relay call identification/indication circuit 51 identifies whether each timeslot is a relay call or a locally-addressed call, according to the eight bit information of the timeslot TS24 in the SD-I 1.5 M frame structure shown in FIG. 3, and sends out a notice to the reception circuit 522a through 522x and the transmission control circuit 523a through 523x, respectively.

That is, the eight bit information of the timeslot TS24 is established by step S74 and step S81 of the flowchart of FIG. 7, and notifies the forms of connection thereof.

First, the transfer of the cell data from the ATM network 20 will be explained.

Figure 5:
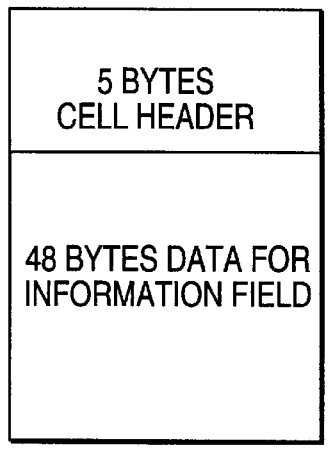
FIG. 5 shows the structure of the ATM cell.

The ATM cell shown in FIG. 5 is inputted to the cell disassembly circuit 32 from the ATM network 20 through a signal line 64.

The cell disassembly circuit 32 determines which timeslot the data should be transferred to based on the cell header attached to the cell, selects the buffer 34a through 34x corresponding to said timeslot to store the forty-eight byte data of the information field, and activates the transmission control circuit 523a through 523x connected to the buffer 34a through 34x.

When the call is recognized as a locally-addressed call based on the indication of the relay call identification/ indication circuit 51, the activated transmission control circuit 523a through 523x transmits the data to the selection circuit 325 in a pattern shown in FIG. 3 which takes out one bit from each of the buffers 34a through 34x for one timeslot.

Figure 6:
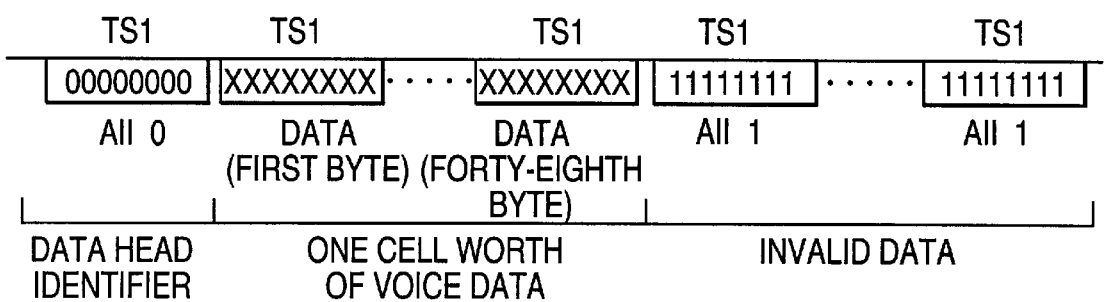
FIG. 6 shows how the data is transferred for a relay call of an 8 Kbps voice compression data between the CLAD device and the transmission device.

When the call is a relay call, as shown in the data structure of FIG. 6, all eight bits indicate "0" which works as the data head identifier. Thereafter, eight bits are taken out for each timeslot, transmitting eight bits of data head identifier and forty-eight bytes of data to the selection circuit 524.

On the other hand, when the transmission control circuit 523 is not activated by the cell disassembly circuit 32, the circuit 523 outputs "1" for all eight bits indicating invalid data.

As explained, when all the bits indicate "1", it means that no effective data is transmitted, and when all eight bits indicate "0", it means that it is a data head identifier.

Figure 4:
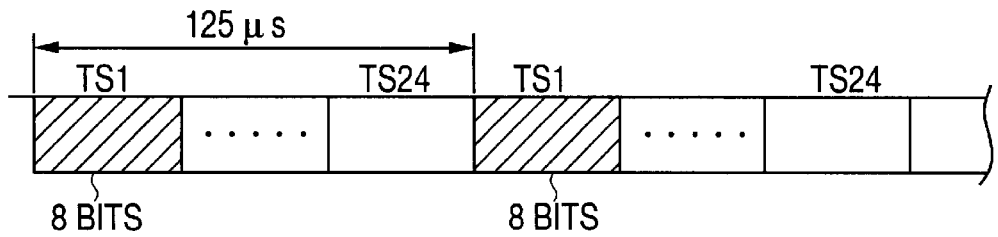
FIG. 4 shows a transmission frame structure for a relay call of an 8 Kbps voice compression data transmitted between the CLAD device and the transmission device.

The digital signal formed by compressing voice data into 8 Kbps which has been transmitted from the transmission device 10 through the signal line 61 by SD-I 1.5 Mbps (JT-G703-a standard) will be transferred by one bit per timeslot when the call is a locally-addressed call as shown in FIG. 3, and by eight bits per timeslot when the call is a relay call as shown in FIG. 4.

When the call is recognized to be a locally-addressed call based on the indication of the relay call identification/ indication circuit 51, the receiving circuit 522a through 522x extracts one bit from the timeslot and stores the data to the buffer 33a through 33x connected to the receiving circuit 522a through 522x.

When the call is a relay call, the circuit extracts eight bits from the timeslot, and detects the data head identifier which indicates "0" for all eight bits. The forty-eight bytes of data following the identifier is stored to the buffer 33a through 33x connected to the receiving circuit.

When the forty-eight bytes are stored to the buffer 33a through 33x, the cell assembly circuit 31 takes out the header corresponding to each of the buffers 33a through 33x and forty-eight bytes of voice compression data from the buffer 33a through 33x to assemble an ATM cell as shown by the cell structure of FIG. 5, and transmits the cell through the signal line 63 to the ATM network 20.

According to the cell relay network of the present invention as mentioned, the analog voice data [AD] from the telephone 40a, for example, is converted at the transmission device 10a into digital data bit-strings [DD], and then transferred to the CLAD device 30a through the cell relay communication equipment 50a. At the CLAD device 30a, the digital data bit-strings being transferred thereto is assembled into cells [ATM cells] for multiplexing, which are transmitted to the CLAD device 30b through the ATM network 20.

The digital data bit-strings gained by disassembling the cells at the CLAD device 30b are sent to the cell relay communication equipment 50b. When the call is a locally-addressed call, the cell relay communication equipment 50b converts the data into low-speed digital data bit-strings [DD], and sends them to the transmission device 10b. The transmission device 10b restores the digital data bit-strings into voice data [AD] and outputs the data to the telephone 40b.

On the other hand, when the call is a relay call, the cell relay communication equipment 50b converts the cells [ATM cells] received from the ATM network to high-speed data [high-speed DD], transfers the data through the transfer device, converts the data at the cell relay communication equipment 50b again into cells [ATM cells], and transfers the data to the ATM network 20, thereby relaying the call to the transmission device 10c.

According to the present invention, in a relay call, the data is transferred through the transmission device 10b by high-speed digital data, so the delay occurring when converting the low-speed voice compression data into ATM cells may be effectively reduced.

As disclosed, according to the present invention, eight bits of the timeslots are used to transfer the relay call, so the voice data compressed to 8 Kbps may be transferred, and the time to store the data equivalent to one cell may be reduced from 48 ms to 6 ms. Therefore, the number of calls to be relayed may be increased when the voice delay time of the whole system may be in the range between 150 ms to 200 ms.

What is claimed is:

1. A cell relay communication method to be used in a relay system which includes a plurality of transmission devices each having a voice relay function and a cell transmission/ reception control function connected to an ATM network through a cell assembly and disassembly device having a function of assembling and disassembling cells including compressed voice data, the method comprising the steps of:

identifying whether a call received from said ATM network is a relay call or a locally-addressed call which is addressed to a device coupled to said each transmission device;

relaying said received call by transferring a compressed voice data with respect to the received call through said transmission device by a higher data speed then a compressed voice data speed when said received call is said relay call; and transferring a compressed voice data with respect to the received call to said transmission device by the compressed voice data speed when said received call is said locally-addressed call.

2. A cell relay communication system of a relay system which includes a plurality of transmission devices each having a voice relay function and a call transmission/ reception control function connected to an ATM network through a cell assembly and disassembly device having a function of assembling and disassembling cells including compressed voice data, wherein said cell relay communication system, being coupled between said each transmission devices and said cell assembly and disassembly device, comprising:

a relay call identification/indication function for identifying and indicating whether a call received from said ATM network is a relay call or a locally-addressed call which is addressed to a device coupled to said each transmission device; and a transfer speed selection function for relaying and transferring a compressed voice data with respect to the received call by a higher data speed then a compressed voice data speed through said transmission device when said received call is said relay call, and transferring a compressed voice data with respect to the received call by the compressed voice data speed to said transmission device when said received call is said locally-addressed call, thereby reducing the delay time generated when relaying the call.

3. A cell relay communication equipment to be used in a relay system which includes a plurality of transmission devices having a voice relay function and a call transmission/reception control function connected to an ATM network through a cell assembly and disassembly device having a function of assembling and disassembling cells including compressed voice data, wherein said cell relay communication equipment, being coupled between said each transmission device and said cell assembly and disassembly device comprising:

a relay call identification/indication means for identifying and indicating whether a call received from said ATM network is a relay call or a locally-addressed call which is addressed to a device coupled to said each transmission device; and a transfer speed selection means for transferring by a higher data speed than a compressed voice data speed with respect to the call to said transmission device when said relay call identification/indication means indicates that said received call is said relay call, and transferring by the compressed voice data speed with respect to the call to said transmission device when said received call is indicated to be said locally-addressed call.

* * * * *